(12) United States Patent
Popov et al.

(10) Patent No.: US 11,297,850 B2
(45) Date of Patent: Apr. 12, 2022

(54) MULTI-FLAVOR FOOD AND/OR BEVERAGE DISPENSER

(71) Applicant: FBD Partnership, LP, San Antonio, TX (US)

(72) Inventors: Igor V. Popov, San Antonio, TX (US); Clifton Jones, San Antonio, TX (US); Alejandro Ramirez, San Antonio, TX (US); Jeanko J. Lara, San Antonio, TX (US); Matthew Gates, Schertz, TX (US)

(73) Assignee: FBD Partnership, IP, San Antonio, TX (US)

( * ) Notice: Subject to any disclaimer, the term of this patent is extended or adjusted under 35 U.S.C. 154(b) by 293 days.

(21) Appl. No.: 16/726,238

(22) Filed: Dec. 23, 2019

(65) Prior Publication Data
US 2020/0128852 A1 Apr. 30, 2020

Related U.S. Application Data

(63) Continuation of application No. 15/018,185, filed on Feb. 8, 2016, now Pat. No. 10,512,276.
(Continued)

(51) Int. Cl.
*A23G 9/28* (2006.01)
*B67D 1/00* (2006.01)
(Continued)

(52) U.S. Cl.
CPC ............. *A23G 9/282* (2013.01); *A23G 9/045* (2013.01); *A23G 9/28* (2013.01); *B67D 1/005* (2013.01);
(Continued)

(58) Field of Classification Search
CPC .......... A23G 9/282; A23G 9/045; A23G 9/28; B67D 1/0021; B67D 1/0036;
(Continued)

(56) References Cited

U.S. PATENT DOCUMENTS 2,236,620 A 4/1941 Cornelius
2,276,811 A 3/1942 Ward
(Continued)

FOREIGN PATENT DOCUMENTS

DE 849 562 9/1952
DE 12 59 913 2/1968
(Continued)

OTHER PUBLICATIONS

FCB (Solid State) Post-Mix Dispenser: Two-Flavor/Hot-Gas Defrost The Cornelius Company, Service Manual, 1989, Anoka, United States.
(Continued)

*Primary Examiner* — Donnell A Long
(74) *Attorney, Agent, or Firm* — McAughan Deaver PLLC

(57) ABSTRACT

Applicants have created an improved multi-flavor food and/or beverage dispenser including an improved nozzle for injection of flavored liquids into a base liquid. The apparatuses and systems described herein can be used with different food and beverage products including, but not limited to, frozen carbonated beverages, frozen alcoholic and non-alcoholic beverages, frozen yogurts, frozen ice creams and other dispensable food and beverage products

20 Claims, 8 Drawing Sheets

Related U.S. Application Data

(60) Provisional application No. 62/113,872, filed on Feb. 9, 2015.

(51) Int. Cl.
*B67D 1/12* (2006.01)
*A23G 9/04* (2006.01)

(52) U.S. Cl.
CPC ......... *B67D 1/0021* (2013.01); *B67D 1/0036* (2013.01); *B67D 1/0039* (2013.01); *B67D 1/0044* (2013.01); *B67D 1/0048* (2013.01); *B67D 1/0085* (2013.01); *B67D 1/1204* (2013.01); *B67D 1/1279* (2013.01); *B67D 1/1284* (2013.01); *B67D 2210/0006* (2013.01)

(58) Field of Classification Search
CPC .. B67D 1/0039; B67D 1/0044; B67D 1/0048; B67D 1/005; B67D 1/0085; B67D 1/1204; B67D 1/1279; B67D 1/1284; B67D 2210/0006; B67D 1/08; B67D 1/0888

See application file for complete search history.

(56) References Cited

U.S. PATENT DOCUMENTS

| | | | |
|---|---|---|---|
| 2,562,638 A | 7/1951 | Philipp | |
| 2,610,478 A | 9/1952 | Lofstedt | |
| 2,735,276 A | 2/1956 | Thompson | |
| 2,934,911 A | 5/1960 | Micai et al. | |
| 3,030,976 A | 4/1962 | Brown | |
| 3,272,388 A | 9/1966 | Max | |
| 3,280,459 A | 10/1966 | Walker | |
| 3,468,137 A | 9/1969 | Welty | |
| 3,517,524 A | 6/1970 | Fielder | |
| 3,661,303 A | 5/1972 | Prosenbauer | |
| 3,677,272 A | 7/1972 | Shrank | |
| 3,945,614 A | 3/1976 | Suzuki et al. | |
| 4,201,558 A | 5/1980 | Schwitters et al. | |
| 4,213,795 A | 7/1980 | Ernstsson | |
| 4,590,970 A | 5/1986 | Mott | |
| 4,632,275 A | 12/1986 | Parks | |
| 4,708,266 A | 11/1987 | Rudick | |
| 4,719,056 A | 1/1988 | Scott | |
| 4,736,600 A | 4/1988 | Brown | |
| 4,745,853 A | 5/1988 | Hoover | |
| 4,784,697 A | 11/1988 | Bordini | |
| 5,270,013 A | 12/1993 | Decker | |
| 5,388,925 A | 2/1995 | Wilcox | |
| 5,415,326 A * | 5/1995 | Durham | B67D 1/0044 222/129.1 |
| 5,553,756 A | 9/1996 | Topper | |
| 5,570,822 A | 11/1996 | LeMarbe et al. | |
| 5,632,411 A | 5/1997 | Harty | |
| 5,740,844 A | 4/1998 | Miller | |
| 5,758,571 A | 6/1998 | Kateman et al. | |
| 5,899,077 A | 5/1999 | Wright | |
| 5,974,824 A | 11/1999 | Galockin | |
| 6,095,371 A | 8/2000 | Mooney | |
| 6,161,558 A | 12/2000 | Franks | |
| 6,189,745 B1 | 2/2001 | Frank | |
| 6,220,047 B1 | 4/2001 | Vogel et al. | |
| 6,296,153 B1 | 10/2001 | Bilskie et al. | |
| 6,345,729 B1 * | 2/2002 | Santy, Jr. | B67D 1/0021 222/1 |
| 6,622,510 B2 | 9/2003 | Giroux et al. | |
| 6,637,214 B1 * | 10/2003 | Leitzke | A23G 9/163 62/342 |
| 6,708,510 B2 | 3/2004 | Sulc et al. | |
| 6,871,761 B2 | 3/2005 | Fox | |
| 7,114,707 B2 | 10/2006 | Rona et al. | |
| 7,562,793 B2 | 7/2009 | Ufheil | |
| 7,913,878 B1 | 3/2011 | Baron et al. | |
| 8,079,230 B2 | 12/2011 | Frank | |
| 8,136,363 B2 | 3/2012 | Ludwig | |
| 8,403,179 B1 | 3/2013 | Gerber | |
| 8,511,516 B2 | 8/2013 | Klopfenstein et al. | |
| 8,528,786 B2 | 9/2013 | Gates | |
| 8,646,286 B2 | 2/2014 | Scherer et al. | |
| 8,701,939 B2 | 4/2014 | Frank | |
| 9,107,449 B2 | 8/2015 | Njaastad et al. | |
| 9,131,709 B2 | 9/2015 | Hammonds et al. | |
| 9,173,521 B2 | 11/2015 | Gates | |
| 9,388,033 B2 | 7/2016 | Gates | |
| 9,457,386 B2 | 10/2016 | Gates | |
| 9,638,434 B2 | 5/2017 | Alston | |
| 9,970,696 B2 | 5/2018 | Hegar et al. | |
| 10,034,488 B2 | 7/2018 | Graczyk | |
| 10,321,699 B2 | 6/2019 | Gates | |
| 10,327,455 B2 | 6/2019 | Gates | |
| 2002/0043071 A1 | 4/2002 | Frank | |
| 2003/0126871 A1 * | 7/2003 | Frank | A23G 9/20 62/135 |
| 2003/0161923 A1 | 8/2003 | Holland et al. | |
| 2005/0051577 A1 | 3/2005 | Loeb et al. | |
| 2005/0067433 A1 | 3/2005 | Brandt et al. | |
| 2006/0186137 A1 | 8/2006 | Till | |
| 2007/0017234 A1 | 1/2007 | Moulder | |
| 2007/0062212 A1 | 3/2007 | Frank | |
| 2007/0125104 A1 | 6/2007 | Ehlers | |
| 2008/0073376 A1 | 3/2008 | Gist et al. | |
| 2008/0073609 A1 | 3/2008 | Akkermann | |
| 2008/0202130 A1 | 8/2008 | Kadyk | |
| 2008/0203113 A1 | 8/2008 | Groh | |
| 2008/0254180 A1 | 10/2008 | Windhab | |
| 2008/0289357 A1 | 11/2008 | Skobel | |
| 2008/0302824 A1 | 12/2008 | Blomme | |
| 2009/0211269 A1 | 8/2009 | Gist et al. | |
| 2009/0230149 A1 | 9/2009 | Smeller et al. | |
| 2010/0044395 A1 | 2/2010 | Webb | |
| 2010/0147875 A1 | 6/2010 | Santos et al. | |
| 2010/0293965 A1 | 11/2010 | Frank | |
| 2010/0319389 A1 | 12/2010 | Yang et al. | |
| 2011/0042414 A1 | 2/2011 | Tachibana | |
| 2011/0049190 A1 | 3/2011 | Sevcik | |
| 2011/0192423 A1 | 8/2011 | Boussemart | |
| 2012/0181287 A1 | 7/2012 | Holbeche | |
| 2013/0140328 A1 | 6/2013 | Gates | |
| 2013/0200103 A1 | 8/2013 | Gates et al. | |
| 2014/0061345 A1 | 3/2014 | Machovina | |
| 2014/0092705 A1 | 4/2014 | Riel | |
| 2014/0209635 A1 | 7/2014 | Gates | |
| 2014/0263414 A1 | 9/2014 | San Miguel et al. | |
| 2015/0335208 A1 | 11/2015 | Ciavarella et al. | |
| 2016/0229675 A1 | 8/2016 | Popov | |
| 2016/0245564 A1 | 8/2016 | Frank et al. | |
| 2016/0245573 A1 | 8/2016 | Frank | |
| 2017/0027185 A1 | 2/2017 | Acosta | |
| 2017/0027188 A1 | 2/2017 | Raybin | |
| 2017/0030467 A1 | 2/2017 | Versteeg | |
| 2017/0064977 A1 | 3/2017 | Bischel | |
| 2017/0225936 A1 | 8/2017 | Jersey et al. | |
| 2017/0320719 A1 | 11/2017 | Zemko et al. | |
| 2018/0103656 A1 | 4/2018 | Acosta | |
| 2018/0106515 A1 | 4/2018 | Cobabe | |
| 2018/0126427 A1 | 5/2018 | Haselwood et al. | |

FOREIGN PATENT DOCUMENTS

| | | |
|---|---|---|
| EP | 0250245 | 12/1987 |
| EP | 0 382 275 | 8/1990 |
| EP | 0 596 221 | 5/1994 |
| EP | 0 598 223 | 5/1994 |
| EP | 1 035 030 | 9/2000 |
| FR | 2 600 978 | 1/1988 |
| GB | 2 181 068 | 4/1987 |
| JP | 59-098653 | 6/1984 |
| JP | 11-235154 | 8/1999 |
| JP | 11-25317 | 9/1999 |
| JP | 2000-224959 | 8/2000 |
| WO | 9321102 | 10/1993 |

(56) References Cited

FOREIGN PATENT DOCUMENTS

| | | |
|---|---|---|
| WO | 03055326 | 7/2003 |
| WO | 2007070031 | 6/2007 |
| WO | 2009124786 | 10/2009 |

OTHER PUBLICATIONS

Martinex Navarro, A., International Search Report for Corresponding International Patent Application No. PCT/US97/00986 dated Jun. 2, 1997, European Patent Office.
De Terlizzi, M., International Search Report for Corresponding International Patent Application No. PCT/US2006/0033535, dated May 9, 2007, European Patent Office.
De Terlizzi, M., Written Opinion for Corresponding International Patent Application No. PCT/US2006/033535, dated May 9, 2007, European Patent Office.

* cited by examiner

MULTI-FLAVOR FOOD AND/OR BEVERAGE DISPENSER

CROSS REFERENCE TO RELATED APPLICATIONS

The present application claims the benefit of and priority to U.S. Provisional Patent Application Ser. No. 62/113,872, filed Feb. 9, 2015, and the contents of which are hereby incorporated by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to frozen beverage machines; and more specifically relate to an improved multi-flavor food and/or beverage dispenser including a nozzle for injection of flavored liquids into a base liquid. Multi-flavor food and/or beverage dispenser are described in U.S. Pat. Pub. No. US 2008/0041876, the relevant disclosure of which is incorporated herein by reference in its entirety.

Description of the Related Art

The inventions disclosed and taught herein are directed to a nozzle for injection of flavored liquids into a base liquid.

BRIEF SUMMARY OF THE INVENTION

As one of many possible brief summaries of the nature and substance of the inventions claimed herein a nozzle assembly may comprise a faceplate comprising, a plurality of O-rings, and one or more injection ports; a nozzle that cooperates with the plurality of O-rings, wherein the nozzle comprises, a plurality of circumferential recesses, wherein each recess cooperates with the plurality of O-rings to define a syrup flow channel, and one or more radially spaced additive ports, wherein the one or more radially spaced additive ports comprise a hole that passes from the outside of the nozzle to a center of the nozzle; a valve stem assembly, wherein the valve stem assembly fits within the nozzle; and wherein the one or more injection ports are aligned with the syrup flow channels. The nozzle may comprise an upper cylindrical section, a flat face section below the upper cylindrical section, sloped conical section below the flat face section and wherein the nozzle comprises a hollow center. The valve stem assembly may be capable of movement within the nozzle. The valve stem assembly may be capable of moving upwards to cause a base product to flow through the hollow center of the nozzle. The valve stem assembly may be capable of moving downwards to cause the valve stem assembly to seat against a portion of the nozzle to stop the flow of a base product. The at least one additive check valve connected to the faceplate may be capable of permitting the flow of an additive to the nozzle assembly. The flow control valve may be capable of controlling the dispensing of the additive. The nozzle assembly may further comprise an external manifold that is capable of multiplexing a plurality of additives into one of the one or more injection ports. The nozzle assembly may further comprise a three-way valve that is capable of permitting the flow of a flushing product to flush out the additive. The nozzle may further comprise a flow diffuser located proximate to the points where the additives are injected that is capable of further mixing the additives with the base product.

As another of the many possible brief summaries of the nature and substance of the inventions claimed herein a method of dispensing a product from a machine may comprise activating a valve stem assembly to open a dispense valve of the valve stem assembly to cause a base product to flow through a central opening in a nozzle assembly into a center of a nozzle, wherein the nozzle assembly further comprises a faceplate; injecting a first additive through a first injection port in the faceplate into a first syrup channel, wherein the first syrup channel is defined by a first circumferential recess of the nozzle cooperating with a first pair of O-rings of the faceplate, into a hollow center of a nozzle; injecting a second additive through a second injection port in the faceplate into a second syrup channel, wherein the second syrup channel is defined by a second circumferential recess of the nozzle cooperating with a second pair of O-rings of the faceplate, into a hollow center of a nozzle; and deactivating the valve stem assembly to close the dispense valve to cause the base product to discontinue flow through the central opening of the nozzle assembly. The nozzle may comprise an upper cylindrical section, which comprises the first circumferential recess and second circumferential recess; a flat face section below the upper cylindrical section; and sloped conical section below the flat face section. The method may further comprise injecting a third additive through a third injection port in the faceplate into a third syrup channel, wherein the third syrup channel is defined by a third circumferential recess of the nozzle cooperating with a third pair of O-rings of the faceplate. The injecting a first additive through a first injection port in the faceplate into a first syrup channel may occur for a limited period of time. The injecting a first additive through a first injection port in the faceplate into a first syrup channel may occur prior to the injecting of a second additive through a second injection port in the faceplate into a second syrup channel. The method may further comprise operating a check valve in the additive fluid path to prevent back flow of the additive fluid. The method may further comprise operating a flow control valve to control the dispensing of the additives. The method may further comprise operating a three-way valve to permit the flow of a flushing product to flush out the additive. The method may further comprise operating an integral diffuser of the points where the additives are injected. The method may further comprise multiplexing a plurality of additives through an external manifold into the first injection port.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1A:
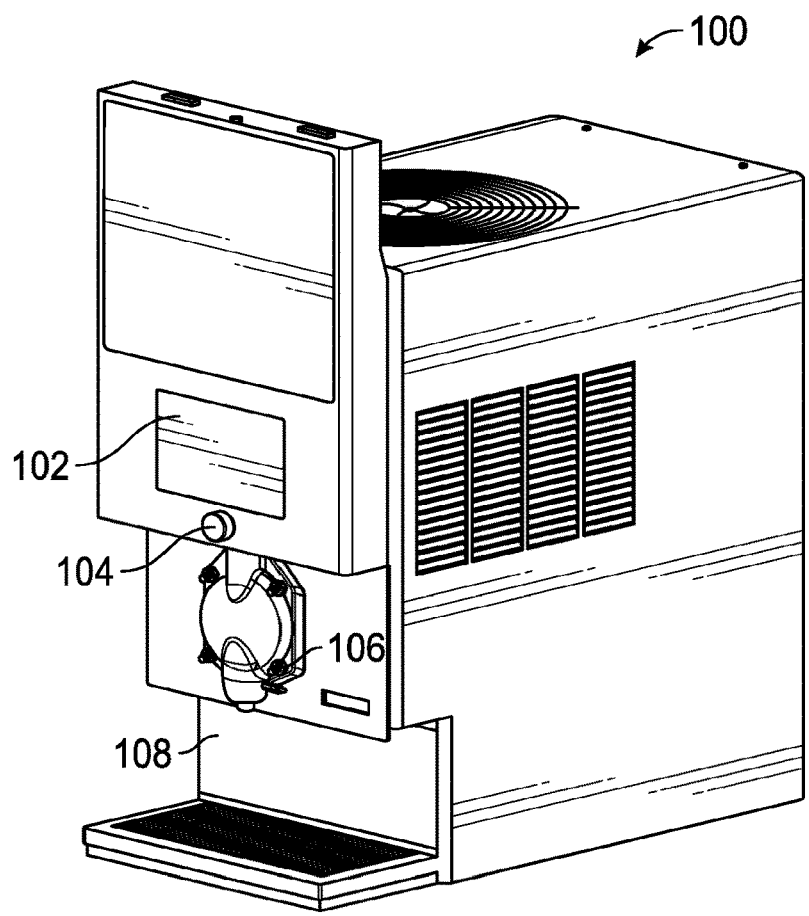
FIG. 1A illustrates an isometric view of an improved multi-flavor food and/or beverage dispenser in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved multi-flavor food and/or beverage dispenser including an improved nozzle for injection of additives into a base liquid.

Figure 1B:
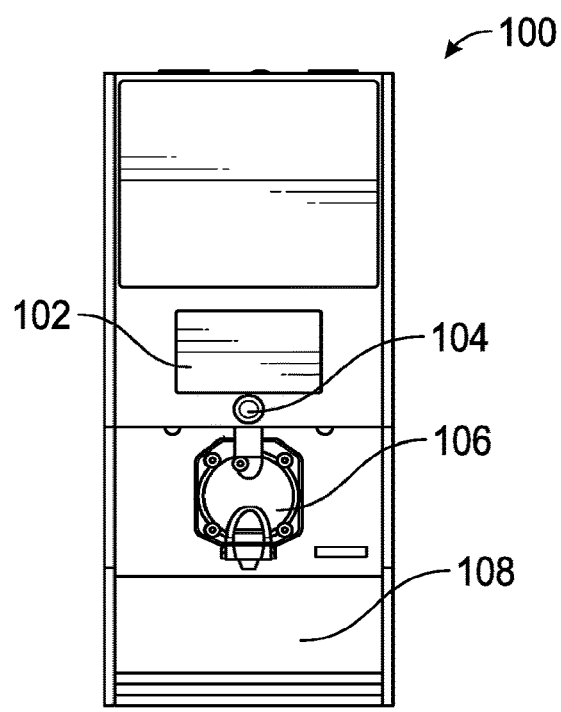
FIG. 1B illustrates a front view of an improved multi-flavor food and/or beverage dispenser in accordance with certain teachings of the present disclosure.

Turning now to the figures, in particular to FIGS. 1A and 1B, an improved multi-flavor food and/or beverage dispenser 100 is illustrated.

For purposes of the present discussion, the food to be dispensed will be described as a frozen non-carbonated beverage, such as a frozen lemonade beverage. It should be understood, however, that the apparatuses and systems described herein can be used with different food and beverage products including, but not limited to, frozen carbonated beverages, frozen alcoholic and non-alcoholic beverages, frozen yogurts, frozen ice creams and other dispensable food and beverage products.

Referring to FIGS. 1A and 1B, the illustrated dispenser may include a touch screen 102, a dispense button 104, a multi-flavor nozzle assembly 106 and a dispense region 108.

Touch screen 102 and dispense button 104 are optional features. Dispense button 104 optionally could be a hardware or software dispense button.

In one embodiment, the touch screen 102 provides a graphical user interface in the form of a display that provides one or more screens of options related to the food/beverage item to be dispensed. For example, in one embodiment, the dispenser may be set up to deliver a base lemonade product and, optionally, the base lemonade product combined with one or more flavoring additives, e.g., a raspberry, cherry, blueberry or cotton candy additive. The user can touch one or more icons on the touch screen 102 to select dispensing of the base beverage and (optionally) dispensing of the base beverage in combination with one or more flavoring additives. In the described embodiment, the touch screen 102 communicates with (or is part of) a control system 220, such as an electronic control system, that receives one or more inputs from the touch screen 102 indicating the selected characteristics for the dispensed product. Electronic control systems are described in U.S. Pat. Pub. No. US 2008/0041876, which is incorporated herein by reference in its entirety.

In the embodiment described above, once the user has used the touch screen 102 to make a selection about the characteristics of the product to be dispensed, the user can activate the dispense button 104 to cause the desired food/beverage item to be dispensed by the machine.

In one embodiment, the machine is a frozen beverage machine in which a frozen base beverage product (e.g., a base lemonade product) is formed in a freezing barrel. In this embodiment, dispensing of the selected product is obtained by having the electronic control system 220—in response to the activation of the dispense button 104—activate a main control valve to permit dispensing of the base beverage product. Depending on whether a flavoring additive was selected, the controller 220 can also activate one or more secondary control valves to cause one or more flavoring additives to be dispensed into the flowing base beverage product such that the product actually dispensed from the multi-flavor nozzle assembly 106 is a mixture of the base beverage product and the selected flavoring or flavorings.

When only one flavoring is selected, the electronic controller 220 can cause dispensing of the base flavor for a limited period of time (e.g., one second) and then cause dispensing of the combination of the base flavor and the selected flavoring for as long as the dispense button is activated. Alternatively, the controller 220 could cause the dispenser to immediately begin dispensing the mixture of the base beverage and the flavoring as soon as the dispense button 104 is activated.

In embodiments where the selected flavorings are each associated with a different color (e.g., blue for blueberry, red for cherry, purple for raspberry, pink for cotton candy), dispensing of the base beverage alone for a limited period, followed by a dispensing of the mixture of the flavoring and the base fluid, will allow the operator of the dispenser to visually perceive the addition of the selected flavorings.

When multiple flavorings are selected, the electronic controller 220 can cause the dispensing of the selected product in a variety of ways. In one embodiment, the controller 220 can cause the machine to dispense the base product simultaneously combined with all selected flavorings. This can be done with, or without, an initial flow of the base fluid alone as described above.

In another embodiment, the selection of multiple flavorings can result in a "layered" dispensing where the base product combined with one selected flavoring is dispensed for a first period of time, and the base product combined with the second flavoring is dispensed for a second period of time, followed by a dispensing period with a third selected flavor, and continuing in the same manner if other flavors are selected. In this embodiment, the layering can be accomplished in a variety of ways. In one such way, the layers are relatively "thick" such that there is little mixing of the various selected flavorings. Such layering could result, for example, in a drink having a visible layer of base product, a visible layer of product mixed with a first flavoring, and any other selected flavorings.

In another way, the base product and flavorings can be dispensed in very limited layers (e.g., with each layer associated with a dispense period of 1-2 seconds or less). In such an embodiment, there will be limited visible layers, and the dispensed product will have a more uniform taste and appearance.

In another way, the selection of multiple additives will cause the dispensing of the additives to be injected in the order in which they were selected.

The manner in which the product is layered, or whether it is dispensed with all flavorings at the same time, may be selected using the touch screen 102.

In one embodiment, once the touch screen 102 is used to select the desired drink characteristics, the dispenser will dispense product having those characteristics for as long as the dispense button 104 is depressed. In another embodiment, the touch screen 102 may also be used to select a desired dispensed portion (e.g., by size: small, medium, large or by volume: 8 oz., 12 oz., 16 oz) and activation of the dispense button may result in dispensing of the product for a period sufficient to dispense the selected portion.

Figure 2A:
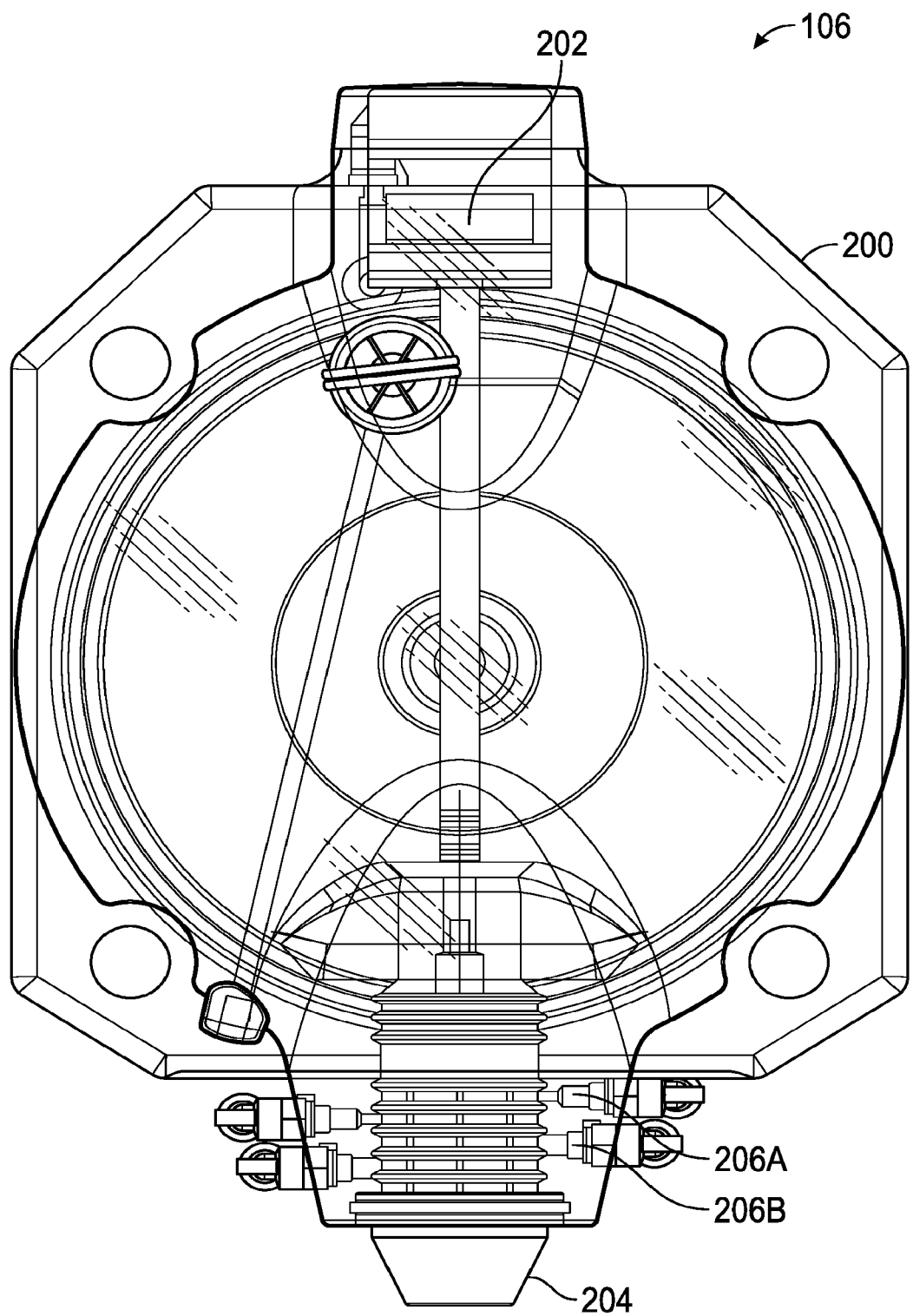
FIGS. 2A-2D illustrate various views of an exemplary multi-flavor dispense nozzle assembly in accordance with certain teachings of the present disclosure.
Figure 2B:
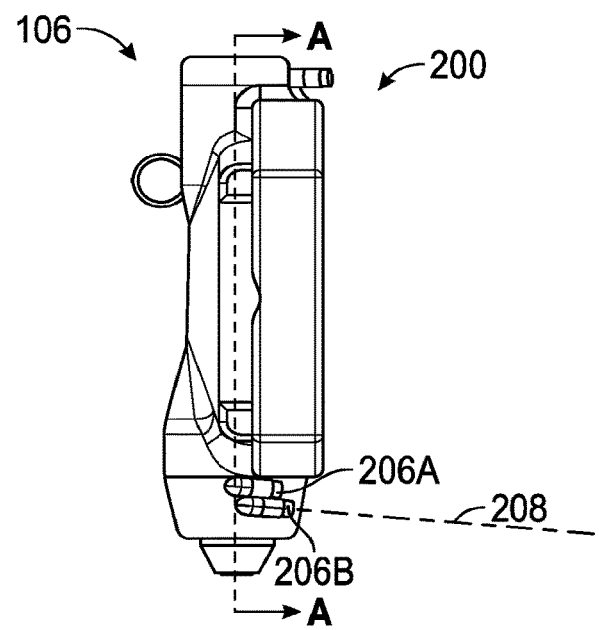
Figure 2C:
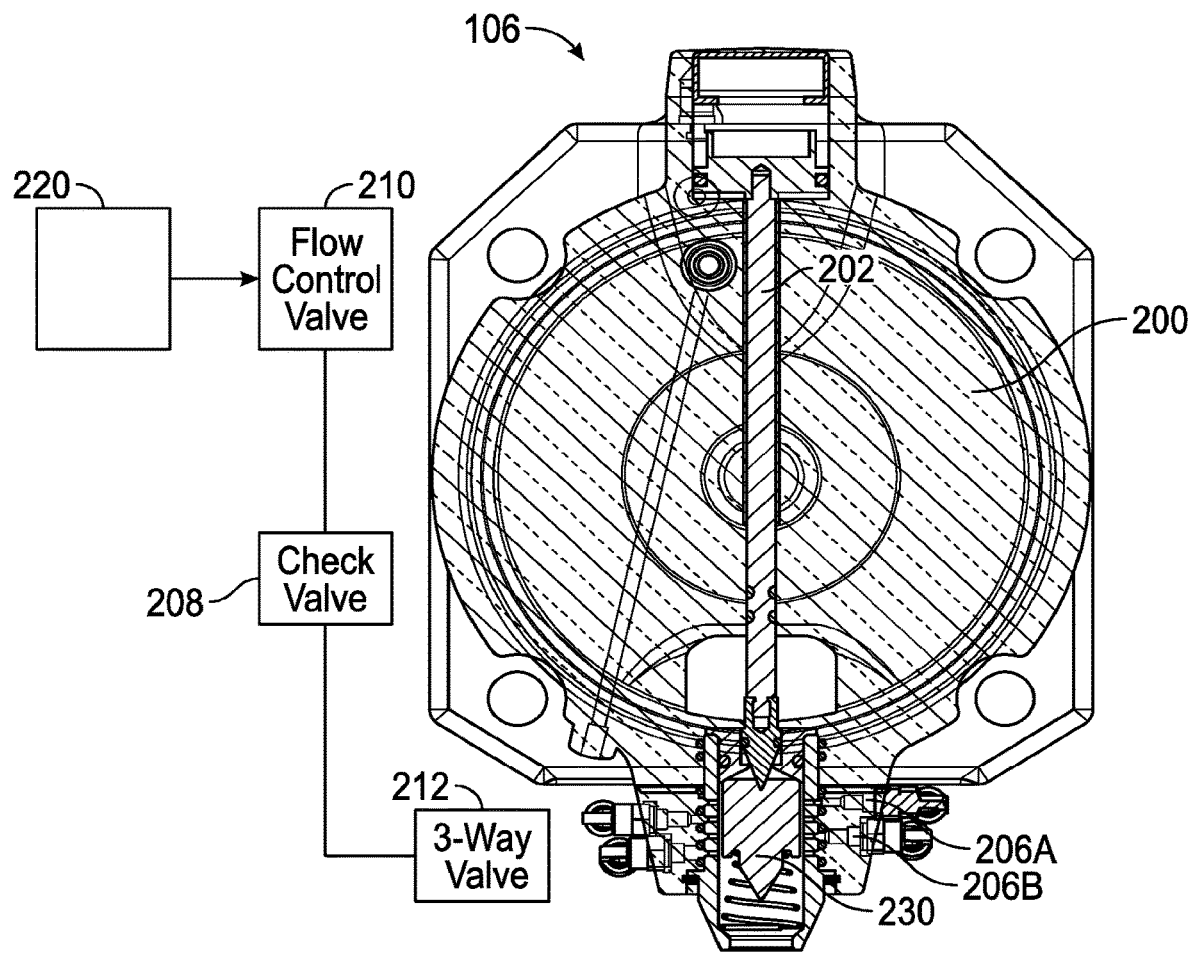
Figure 2D:
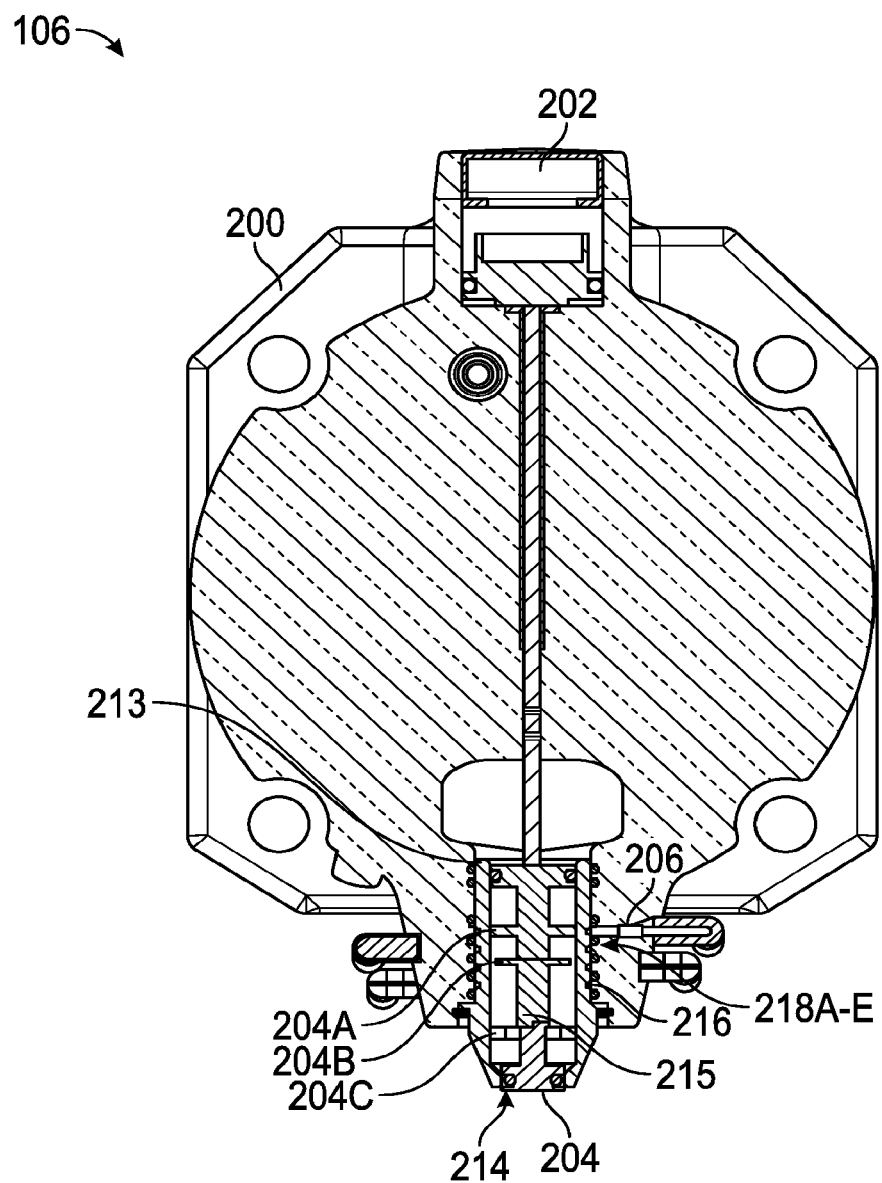

Details of an exemplary multi-flavor dispense nozzle 106 are provided in FIGS. 2A-2D. FIG. 2A provides a front level view of the multi-flavor dispense nozzle 106, FIG. 2B provides a side view of the same and FIGS. 2C and 2D provide cross-sections at various points.

Referring to FIG. 2A, an improved multi-flavor dispense nozzle assembly 106 is illustrated. The improved assembly includes a faceplate 200; a pneumatically actuated valve stem assembly 202; a multi-flavor nozzle 204 that cooperates with O-rings positioned in the faceplate 200 (not numbered in FIG. 2A, but shown, for example, in FIG. 2D) to define a plurality of syrup channels; and additive injection ports 206A and 206B, one or more associated with each syrup channel.

In operation, activation of the dispense button 104 will cause movement of the valve stem assembly 202 upward, which will open the main dispense valve of the valve stem assembly and cause the base beverage product to begin flowing through a central opening in the multi-flavor dispense nozzle 106 and out of the multi-flavor nozzle 204 to the dispense region 108. At the time determined by the controller system 220 a number of additive control valves will activate causing additives to flow from a storage region (tank, bag in a box, etc) through tubing (not shown), through the additive injection port 206 associated with the flavoring, into the syrup channel associated with the flavoring and into the dispensed main beverage.

FIG. 2B shows a side view of the multi-flavor nozzle 106. It illustrates the faceplate 200 and two additive injection ports 206A and 206B. In the illustrated embodiment, each injection port is formed from an opening in the faceplate, a fitting that is inserted into the opening and tubing that runs exterior to the faceplate (not illustrated) coupled to a valve that can be activated to control the flow of an additive through the tube and into the injection port. More or fewer additive injection ports may also be used and implemented.

FIG. 2B also shows the optional use of a check valve 208 that may be included in the fluid path of any additives to prevent back flow of the dispensed product back to the reservoir containing the additive.

FIG. 2C provides still further details of a described exemplary embodiment of the multi-flavor nozzle 106. It shows the faceplate 200, the valve stem assembly 202 and the optional check valve 208. It also illustrates in a schematic fashion a flow control valve 210 that can be used to control the dispensing of the additives, which may be flavoring additives. As described above, in addition to operating the main pneumatic valve associated with the flow of the base product, the electronic controller may control operation of the flow control valves to ensure that the appropriate volume of additive is added when that additive is selected by the user and to ensure that the additive flow is maintained at a consistent flow rate. The use of an electric flow control valve 210 and an electronic controller 220 is significant because the amount of additive that should be added for a given flow of base beverage product will not be constant, but will vary with the nature of the additive. For example not all flavoring additives have equal strength and the proper ratio of additive to base beverage to achieve a desirable drink mix The use of an electronic controller 220 and electric control valves enables the described dispenser to be readily adapted to the dispensing of most any additive product—base beverage mixture.

In one embodiment, the electric flow control valves 210 may be formed from pressure compensating ceramic flow control pistons that have a manually adjustable flow rate in a "bang-bang" control scheme. In this embodiment, when the electronic controller desires to dispense a particular additive, a signal is sent to a solenoid to open the valve associated with that additive and when the controller wishes to cease dispensing the additive it de-energizes the solenoid causing the valve to close.

Alternate embodiments are envisioned where the controller 220 and the flow control valve form a closed-loop control system that reads a pressure differential and calculates a flow rate. In such an embodiment, the error between the desired and actual flow rates would be used to control a high-speed solenoid, which meters a desired amount of syrup into the base flavor flow.

FIG. 2C also illustrates the inclusion of an optional three-way valve 212. Such a three-way valve may be used to permit flow of a neutral flavored product (or other gas or liquid) (e.g., the base product or another product) to "flush" out a syrup channel after each use to prevent flavor mixing and/or to eliminate any color rings associated with the syrup channel that would be visible through the faceplate.

As a final matter, FIG. 2C illustrates the use of flow diffusers 230. These flow diffusers (optional) are located downstream or in the stream of the syrup channels and downstream of the points where the additives are injected into the base product flow. The use of diffusers 230 can help with mixing the additives with the base product as the additives and base product flow through the valve.

In alternate embodiments, a variety of alternative flow diffusers 215 may be integrated directly into the valve stem assembly 202 as shown in FIG. 2D.

The cross-section of FIG. 2D illustrates in greater detail some of the seals and sealing surfaces associated with the exemplary embodiment of the multi-flavor nozzle assembly 106 described above.

Referring to FIG. 2D, a primary seal 213 is illustrated which may prevent flow of any of the additives into the base mixture. The primary seal 213 may also be an upper seal. This seal may be formed using an O-ring, an appropriate gasket or both. A secondary seal 214 shown as part of an alternative embodiment of the valve stem assembly 202 may also be provided at the juncture of the valve stem assembly 202 and the faceplate 200. The secondary seal 214 is optional. A secondary seal 214 may also be a lower seal. The purpose of this seal is to minimize drippage of the additives and/or the base product through the dispensing valve when dispensing is not desired.

FIG. 2D also illustrates the O-rings 218A-E that cooperate with the insertable nozzle 204 to form the syrup channels and the formed syrup channels 216. Only some of the O-rings and syrup channels are numbered in FIG. 2D.

FIGS. 3A, 3B, 4A and 4B illustrate the manner in which the insertable nozzle 204 and O-rings positioned within the faceplate can cooperate to form the described syrup channels 216.

Figure 3A:
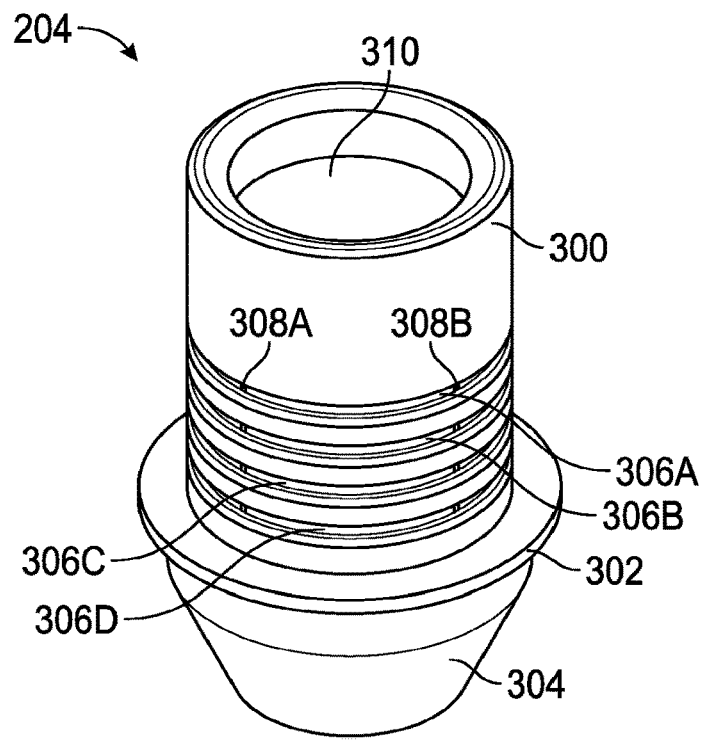
FIG. 3A illustrates an exemplary insertable nozzle of an exemplary multi-flavor dispense nozzle assembly in accordance with certain teachings of the present disclosure.

Referring first to FIG. 3A, an exemplary insertable nozzle 204 is illustrated. As is shown, the nozzle 204 is hollow through the center 310 and defines an upper cylindrical section 300, a flat face section 302 and a sloped conical section 304. Alternatively, sections 300, 302, and 304 may be formed into different shapes than as described in FIG. 3A or 3B. In operation, the valve stem assembly 202 fits within the nozzle 204 such that movement of the valve of valve stem assembly 202 upwards will cause the base product to flow through the interior of the nozzle 204 and movement of the valve of valve stem assembly 202 downward will cause the valve to seat against the nozzle 204 and stop the flow of the base product. The valve stem assembly 202 can seal against the upper and/or lower portion of the nozzle 204 depending on whether or not the primary seal 213 or secondary seal 214 are in place. Other shapes and configurations are envisions for nozzle 204.

Figure 3B:
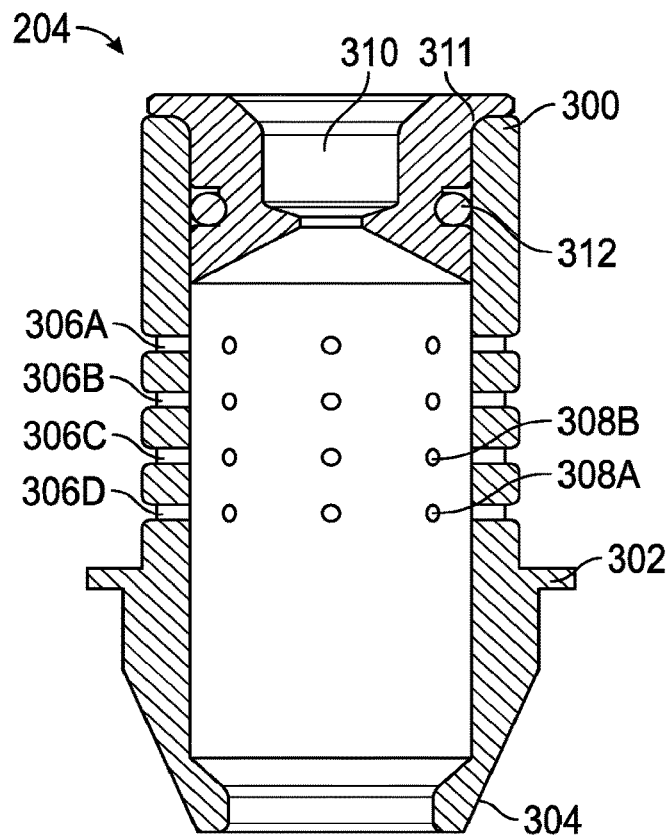
FIG. 3B illustrates a cross-section view of an exemplary insertable nozzle with an exemplary optional flow control insert of an exemplary multi-flavor dispense nozzle assembly in accordance with certain teachings of the present disclosure.

An alternative embodiment of the nozzle 204 illustrated in FIG. 3B illustrates a flow limiting insert 311 with sealing O-ring 312 that can be used to limit the flow of the base liquid and also be used as the sealing surface for the primary seal 213.

The upper cylindrical section 300 further defines circumferential recesses 306A, 306B, 306C and 306D. In the illustrated embodiment, these circumferential recesses define the syrup flow channels.

In the examples of FIG. 3A-3B, each circumferential recess further defines a plurality of radially spaced additive ports, two of which are labeled as 308A and 308B. Each additive port 308A, 308B in the example comprises a hole that passes from the outside of the nozzle 204 to its interior. As such, when an additive is injected into a syrup flow channel (e.g. 306A, 306B, 306C, 306D) with pressure, it will be forced through the additive ports 308A, 308B and into the flow of the base product flowing through the interior of the nozzle 204. In the illustrated example, each circumferential recess defines four additive ports, and the additive ports are equally spaced about the recess.

Figure 4A:
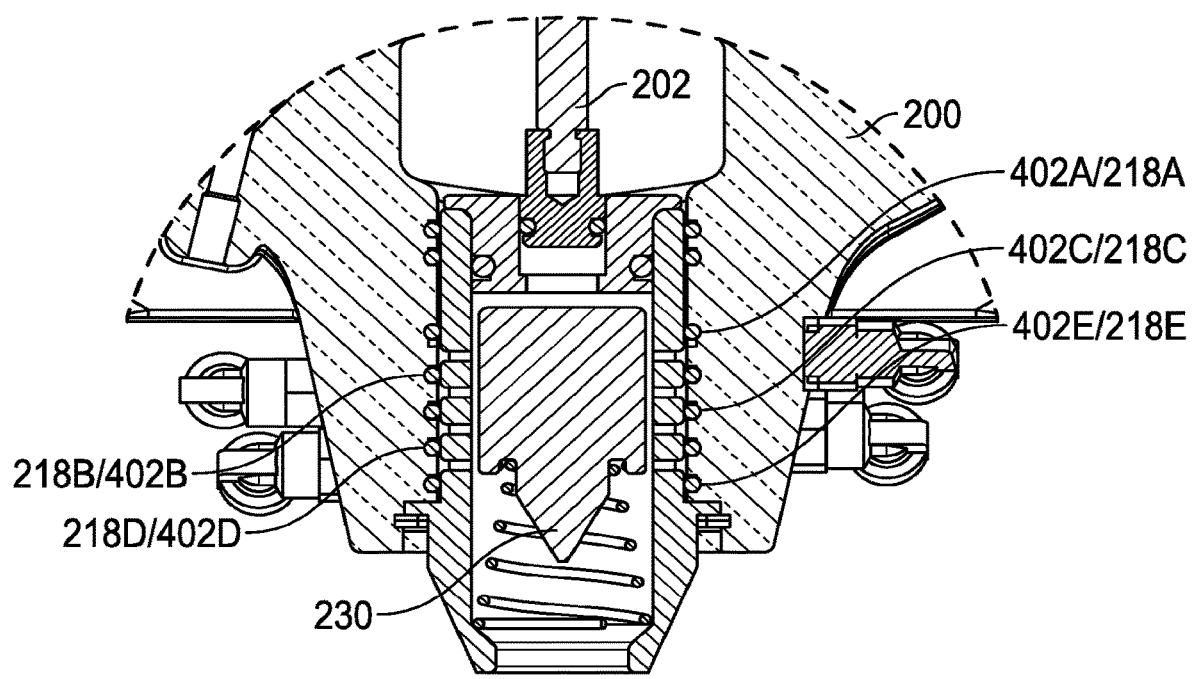
FIGS. 4A-4B illustrate cross-section views of portions of an exemplary faceplate of an exemplary multi-flavor dispense nozzle assembly in accordance with certain teachings of the present disclosure.
Figure 4B:
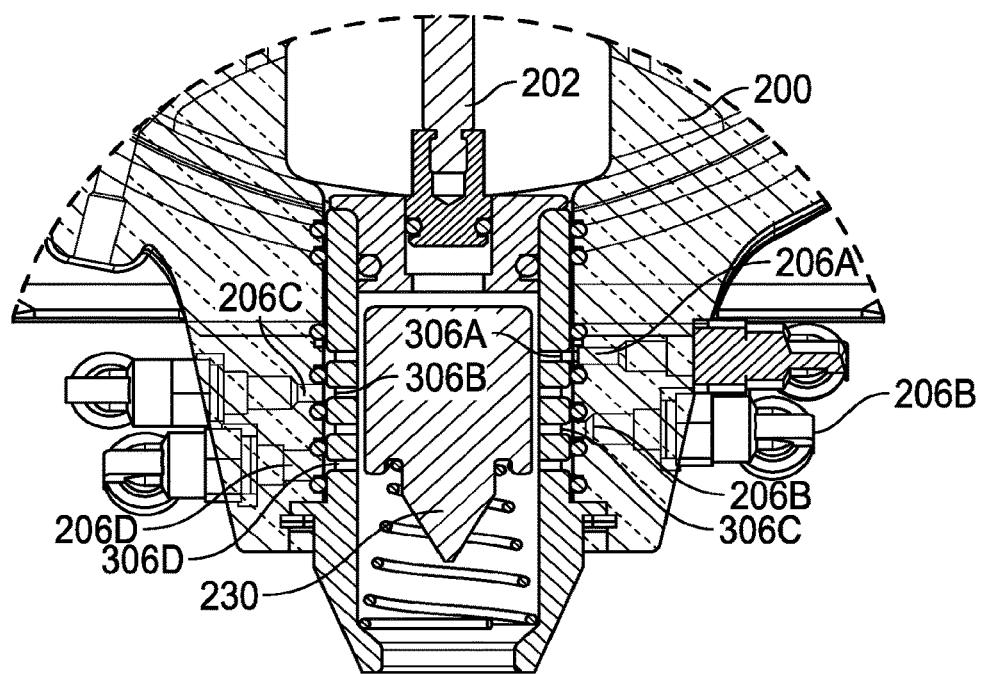

Further details of the faceplate are shown in FIGS. 4A and 4B.

Referring to FIG. 4A the portion of the faceplate 200 that receives the nozzle 204 is illustrated. As illustrated in FIG. 4A, the faceplate defines a plurality of O-ring recesses 402A, 402B, 402C, 402D, and 402E. Referring to FIG. 4B, the faceplate further provides a plurality of injection port 206A, 206B, 206C and 206D. When the disclosed dispenser is fully assembled, O-rings (218A-E) will be inserted into the O-ring openings and the nozzle 204 will be then inserted into the cavity within the faceplate 104 in which the O-rings are positioned. The combination of the O-rings (218A, 218B, 218C, 218D, and 218E) and the circumferential recesses (306A, 306B, 306C, and 306D) in the nozzle will result in the creation of four syrup flow channels. More or fewer than four syrup flow channels may also be used and implemented.

Figure 5A:
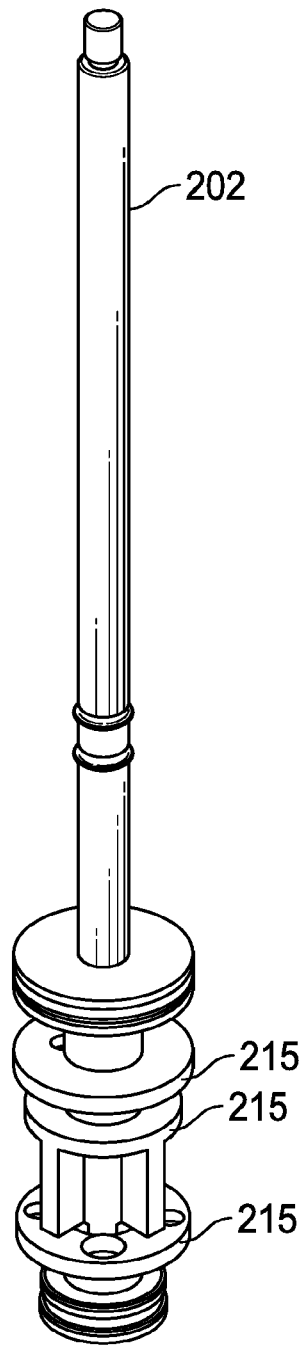
FIGS. 5A-5C illustrates isometric views of three exemplary valve stem assemblies in accordance with certain teachings of the present disclosure.
Figure 5B:
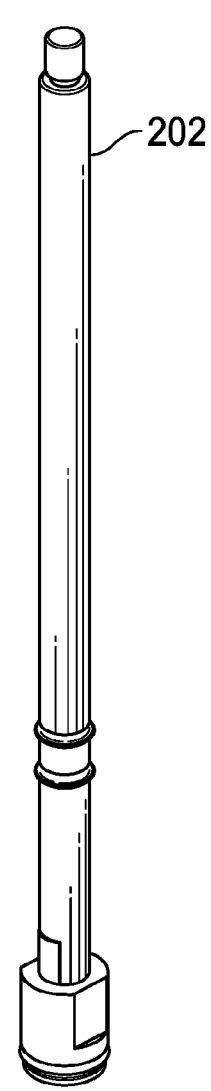
Figure 5C:
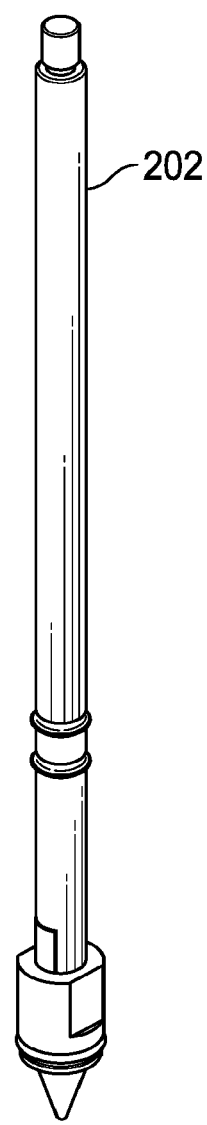

FIGS. 5A, 5B, 5C illustrate isometric views of three exemplary valve stem assemblies 202. FIG. 5A illustrates a valve stem assembly 202 using optional integrated diffusers 215. FIGS. 5B and 5C illustrate alternative embodiments of the valve stem assembly 202, which may be used with the flow-limiting nozzle insert 311.

Figure 6:
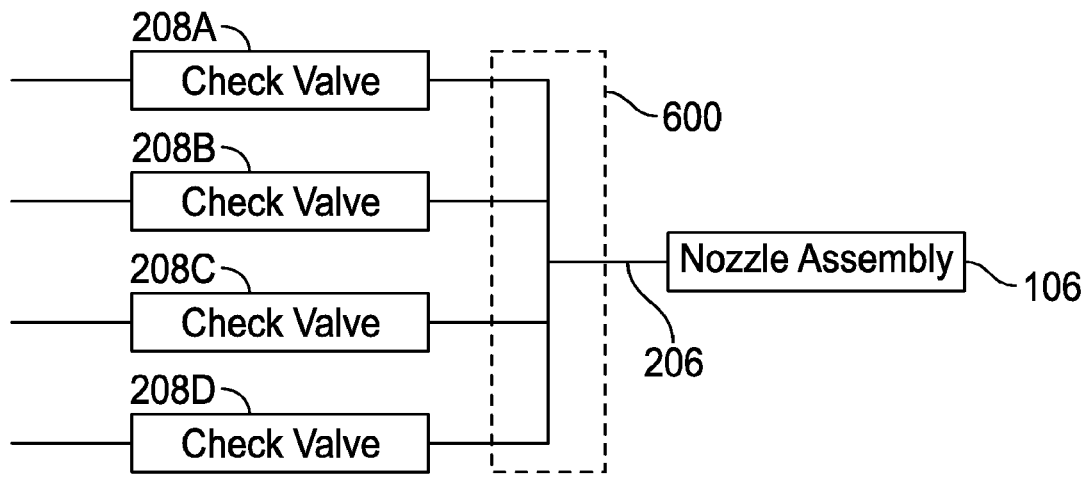
FIG. 6 schematically illustrates an exemplary nozzle assembly with an external additive multiplexing manifold in accordance with certain teachings of the present disclosure

FIG. 6 illustrates schematically an exemplary embodiment of the nozzle assembly 106 where multiple additives may be multiplexed into a single injection port 206 from an external multiplexing manifold 600. Optional additive flow path check valves 208A-D may be integrated into the multiplexing manifold 600 or may be located in the additive flow path before the manifold.

In alternative embodiments of the multiplexing manifold 600, one of the additives may be replaced with a purging or flushing medium to flush out the manifold line to the nozzle assembly 106, and the nozzle assembly 106.

Figure 7:
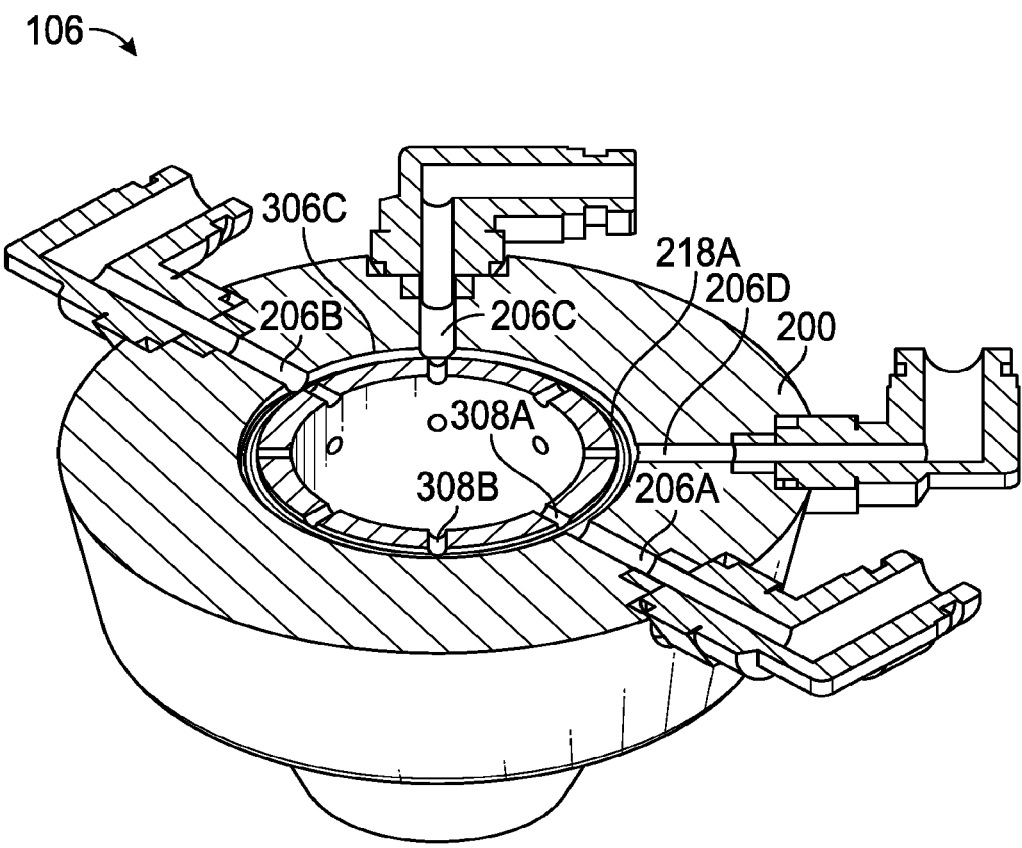
FIG. 7 illustrates a cutaway isometric view of an exemplary nozzle assembly showing an exemplary flow channel with a plurality of injection ports in accordance with certain teachings of the present disclosure.

FIG. 7 illustrates a cutaway isometric view of an alternative embodiment of the nozzle assembly 106 where multiple injection ports (206A, 206B, 206C, 206D) are connected to the same circumferential recess (306C), whereas in FIGS. 4A and 4B the injection ports 206A-D are each connected to its own respective circumferential recess (306A-306D). FIG. 7 illustrates a plurality of radially spaced additive ports, two of which are labeled as 308A and 308B.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A multi-flavor dispensing assembly, comprising:
    a valve having a bore defined by a bore wall, a first end, and a second end;
    the bore having a plurality of fluid ports extending radially through the bore wall;
    the valve configured to receive a base fluid at the first end, and to dispense a mixed beverage from the second end;
    a single channel disposed circumferentially about the bore and disposed between the first and second ends, the single channel configured to fluidly communicate with the bore through the plurality of fluid ports; and
    a single manifold configured to receive a plurality of fluids and to selectively inject one or more of the plurality of fluids into the bore through the single channel and plurality of fluid ports.

2. The assembly of claim 1, further comprising a fluid injector operatively associated with the manifold, and where at least one of the plurality of fluids is a purging fluid capable of flushing the injector.

3. The assembly of claim 2, where the purging fluid is a gas or a liquid.

4. The assembly of claim 2, where the purging fluid is a neutral flavored beverage product.

5. The assembly of claim 2, where the purging fluid is the base fluid.

6. The assembly of claim 2, where the injector is further configured to flush the channel and the plurality of fluid ports with the purging fluid.

7. The assembly of claim 1, where the bore comprises a nozzle configured to be inserted in to the valve.

8. A multi-flavor dispensing assembly, comprising:
    a valve comprising a bore disposed within the valve and having a first end configured to receive a base fluid and a second end configured to dispense a mixed beverage comprising the base fluid and one or more additive fluids, the bore having a length between the first and second ends;
    a fluid channel surrounding a portion of the length of the bore between the first and second ends,
    a plurality of fluid ports, each fluid port in fixed radial alignment with the fluid channel and bore, each fluid port communicating from the fluid channel to the bore, and each fluid port configured such that one or more additive fluids in the fluid channel can flow into and mix with the base fluid to form the mixed beverage; and
    at least one injector associated with the valve and configured to inject the one or more additive fluids into the channel such that the additive fluid flows through the fluid channel and the plurality of ports and into the bore.

9. The assembly of claim 8, further configured to inject a purging fluid to purge the one or more additive fluids from the injector, fluid channel and plurality of fluid ports.

10. The assembly of claim 9, configured such that the purging fluid is introduced through a three-way valve.

11. The assembly of claim 9, configured such that the purging fluid is the base fluid.

12. The assembly of claim 8, further comprising a diffuser disposed in the bore and configured to mix within the bore the base fluid and the at least one additive fluid.

13. The assembly of claim 8, where the bore comprises a nozzle configured to be inserted and retained in the valve, and where the nozzle comprises the plurality of fluid ports and at least a portion of the fluid channel.

14. The assembly of claim 13, where the outside of the nozzle is configured to cooperate with a plurality of o-rings in the valve to form the fluid channel.

15. A multi-flavor nozzle assembly, comprising:
    a nozzle assembly bore;
    a multi-flavor nozzle configured to be inserted into and removed from the nozzle assembly bore;
    the multi-flavor nozzle defining a beverage bore configured to receive a base fluid and to dispense a mixed beverage comprising the base fluid and at least one additive fluid, the beverage bore comprising a plurality of fluid ports;
    a circumferential channel existing between the nozzle assembly bore and the multi-flavor nozzle and configured to fluidly communicate with the beverage bore through the plurality of fluid ports;
    a manifold having a single outlet fluidly connected to the circumferential channel and having a plurality of inputs fluidly connected to the single outlet;
    a plurality of control valves, each control valve fluidly coupled to one of the plurality of manifold inlets and each control valve configured to supply a selected fluid to the manifold outlet;
    the assembly operatively configured so that after supplying a first additive fluid to the beverage bore, a flushing fluid can be supplied to the manifold to purge the first additive fluid from the channel and the plurality of fluid ports.

16. The assembly of claim 15 operatively configured to supply a second additive fluid to the manifold such that the fluid ports inject the second additive fluid into the base fluid after the first additive fluid.

17. The assembly of claim 15, where the flushing fluid is a gas.

18. The assembly of claim 15, where the flushing fluid is a neutral flavored beverage ingredient.

19. The assembly of claim 15, further comprising
    a second circumferential channel existing between the nozzle assembly bore and the multi-flavor nozzle and configured to fluidly communicate with the beverage bore through a plurality of second channel fluid ports;
    at least one control valve fluidly coupled to the second circumferential channel.

20. The assembly of claim 19, further comprising
    a second manifold having a single second manifold outlet fluidly connected to the second circumferential channel and a plurality of second manifold inputs fluidly connected to the single second manifold outlet.

\* \* \* \* \*